(12) United States Patent
Smith

(10) Patent No.: US 6,846,013 B2
(45) Date of Patent: Jan. 25, 2005

(54) AIRBAG INFLATOR DIFFUSER SYSTEM AND METHOD OF MANUFACTURE

(75) Inventor: Bradley W. Smith, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 25 days.

(21) Appl. No.: 09/996,029

(22) Filed: Nov. 19, 2001

(65) Prior Publication Data
US 2003/0094799 A1 May 22, 2003

(51) Int. Cl.[7] ............................................. B60R 21/26
(52) U.S. Cl. ...................................... 280/740; 280/736
(58) Field of Search .............................. 280/740, 730.2, 280/728.2, 742, 736

(56) References Cited

U.S. PATENT DOCUMENTS

| 4,068,862 | A | * | 1/1978 | Ishi et al. .................... 280/740 |
|---|---|---|---|---|
| 4,153,273 | A | | 5/1979 | Risko |
| 4,332,398 | A | | 6/1982 | Smith |
| 4,414,902 | A | | 11/1983 | Strasser |
| 4,944,527 | A | | 7/1990 | Bishop |
| 5,172,933 | A | * | 12/1992 | Strasser ....................... 280/740 |
| 5,308,108 | A | | 5/1994 | Rion |
| 5,340,147 | A | | 8/1994 | Fontecchio |
| 5,447,105 | A | | 9/1995 | Bauer |
| 5,503,429 | A | | 4/1996 | Wallner |
| 5,542,701 | A | | 8/1996 | Rion |
| 5,547,217 | A | | 8/1996 | Zelenak |
| 5,788,266 | A | | 8/1998 | Rose |
| 5,816,610 | A | * | 10/1998 | Higashiura et al. ....... 280/728.3 |
| 5,918,898 | A | * | 7/1999 | Wallner et al. ........... 280/728.2 |
| 6,095,561 | A | | 8/2000 | Siddiqui |
| 6,231,069 | B1 | * | 5/2001 | Yokoyama ................ 280/730.2 |
| 6,336,659 | B1 | * | 1/2002 | Corrion ....................... 280/736 |
| 6,419,266 | B1 | * | 7/2002 | Morfouace et al. .......... 280/740 |
| 6,467,805 | B1 | * | 10/2002 | Schnowitz et al. .......... 280/740 |

* cited by examiner

Primary Examiner—David R. Dunn
(74) Attorney, Agent, or Firm—Sally J. Brown

(57) ABSTRACT

An airbag inflator system and method of manufacture is disclosed which may be stored in a small area, is simple to fabricate, directs exhaust gas from a standardized inflator, sufficiently cools and diffuses the exhaust gas, and catches hot gas generant residue. The system includes an airbag inflator within a sleeve. Solid sections of the sleeve circumscribe the inflator and are positioned to divert exhaust gas leaving an exit port of the inflator. The configuration of the solid sections provides that the inflator need not be rotated during assembly to position exit ports below solid sections. The diverted exhaust gas unrolls the sleeve to form an exhaust passage. The gas passes through the exhaust passage and is dispersed by the permeable section before entering the textile airbag. In this way, a simple, effective diffusion system for curtain airbag inflators is provided.

19 Claims, 6 Drawing Sheets

AIRBAG INFLATOR DIFFUSER SYSTEM AND METHOD OF MANUFACTURE

BACKGROUND OF THE INVENTION

1. The Field of the Invention

The present invention relates to airbag inflation systems in motor vehicles. More specifically, the invention relates to an airbag diffusion system for diffusing inflation gases exiting a curtain airbag inflator.

2. Technical Background

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

A modern airbag apparatus may include an electronic control unit (ECU) and one or more airbag modules. The ECU is usually installed in the middle of an automobile, between the passenger and engine compartments. If the vehicle has a driver airbag only, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag that cushions a passenger during impacts to prevent injury to the passenger. In some airbag apparatuses, the airbag may be fully inflated within 50 thousandths of a second and deflated within two tenths of a second.

An airbag cover, also called a trim cover panel, covers a compartment containing the airbag module and may reside on a steering wheel, dashboard, vehicle door, along a vehicle roof rail, vehicle wall, or beneath the dash board. The airbag cover is typically made of a rigid plastic and may be forced open by the pressure from the deploying airbag. In deploying the airbag, it is preferable to retain the airbag cover to prevent the airbag cover from flying loose in the passenger compartment. If the airbag cover freely moves into the passenger compartment, it may injure a passenger.

Airbag apparatuses have been primarily designed for deployment in front of an occupant between the upper torso and head of an occupant and the windshield or instrument panel. Conventional airbags, such as driver's or passenger airbags (hereinafter referenced as the "primary airbag"), protect the occupant's upper torso and head from colliding with a windshield or instrument panel.

Airbag technology has advanced to include airbag apparatuses which protect occupants during a side impact, or roll-over accident. In these accidents, the occupant may be thrown against the windows, doors and side-walls of the vehicle. These airbag apparatuses are known as curtain airbags. Generally, the curtain airbag is attached to a thin long frame member which runs along a side of the roof of the vehicle. Often due to window size and visibility requirements, the curtain airbag apparatus has a long thin shape.

Generally, the airbag of a curtain airbag apparatus inflates and descends from the frame member to cover a majority of the area between the occupant and the side of the vehicle interior. The inflated airbag appears much like a curtain covering the vehicle window. The curtain airbag may protect the occupant from impact with a side window, flying shards of glass, and other projectiles. The curtain airbag may also help to keep the occupant inside the vehicle during a roll-over accident.

Generally, the un-inflated curtain airbag is installed in a very limited thin space defined by the roof frame member. Accordingly, the inflator may be a thin, cylindrical member which extends a portion of the length of the curtain airbag. In this manner, the curtain airbag inflator is capable of providing sufficient inflation gas to properly inflate the curtain airbag.

Generally, the inflator is installed within the textile bag of the curtain airbag apparatus. However, doing so generally requires the inflator to include a diffuser. Gas which fills the curtain airbag is generated by the ignition of gas generant within the inflator. Generally, the gas is created from the rapid burning of pyrotechnic materials.

The gas (also referred to herein as exhaust gas) escapes exit ports in the inflator at a high velocity and temperature. Due to the limited space, the textile bag is generally stored by folding it up against the inflator. Without a diffuser, the hot gas is concentrated on the textile bag. The concentrated hot gas and the confined space may combine to cause the gas to burn one or more holes in the airbag material, which is generally a nylon or polyester weave. The holes may cause the curtain airbag to inflate improperly.

A diffuser disperses the exhaust gas. Dispersing the gas allows the gas to expand and cool. A diffuser may also include a surface which further allows the gas to transfer some of its heat. A diffuser may be used to direct the gas leaving the exit ports. Gas may be directed to cause the textile airbag to inflate in a particular manner. Once the gas passes through a diffuser, the gas is sufficiently cooled and/or not concentrated to prevent burning holes in the textile airbag.

Additionally, the gas may be directed through an exhaust passage to allow the gas to further cool before entering the airbag. Conventionally, exhaust passages are structures formed between the inflator and the diffuser. These exhaust passages occupy valuable space when the diffuser and inflator are installed and not in use. Space occupied by exhaust passages may be used to provide a more safe and/or aesthetically pleasing installation area for the airbag apparatus.

A diffuser may be built as part of the body of the inflator. Generally, doing so adds to the production and design costs of the inflator. Alternatively, separate parts may be secured to the inflator at appropriate points to function as diffusers and to direct the exhaust gas. Alternatively, one or more parts may be secured to each other to form the diffuser. Securement may be accomplished using a weld or other conventional technique. Such securement techniques generally increase production time and assembly costs.

When a diffuser is incorporated into the body of the inflator, this may require custom fabrication of inflator bodies including diffuser features for different vehicles. Additionally, non-standard inflator/diffuser combinations may increase training time required for workers assembling the airbag apparatus. Custom fabrication is also expensive.

Additionally, conventional diffusers may include parts or sections that must be positioned to properly obstruct gas exit ports of an inflator. For example, the diffuser and inflator may need to be radially oriented with respect to each other to ensure proper operation of the diffuser. This adjustment adds delay and a skill requirement in the assembly process of the completed airbag apparatus.

Accordingly, it would be an advancement in the art to provide an airbag diffusion system which is simple to fabricate. It would be a further advancement to provide an airbag diffusion system which directs the gas using a standardized inflator. Additionally, it would be an advancement in the art to provide an airbag diffusion system which prevents concentrated gas jets and cools the gas exiting the inflator to prevent holes in the airbag material. A further advancement in the art would be to provide a diffusion system and method of fabrication having minimal expense. Additionally, it would be an advancement in the art to provide an airbag diffusion system which is compact to allow the system to be installed in areas of small dimensions relative to conventional diffusion systems. It would be a further advancement in the art to provide a diffusion system that does not require rotational alignment of diffuser members and gas exit ports. The present invention provides these advancements in a novel and useful way.

BRIEF SUMMARY OF THE INVENTION

The apparatus of the present invention has been developed in response to the present state of the art, and in particular, in response to the problems and needs in the art that have not yet been fully solved by currently available airbag inflator diffusion systems. Thus, the present invention provides an airbag inflator diffusion system which is simple to fabricate and install, is compact, directs gas exiting the inflator, effectively diffuses and cools the gas, and may be fabricated with minimal expense.

In one embodiment, the airbag inflator diffusion system includes an airbag inflator. The inflator includes one or more gas exit ports disposed along its surface. The system also includes a sleeve. The inflator is installed securely within the sleeve. Generally, the sleeve is cylindrical in shape. Alternatively, the sleeve has a cross-section capable of receiving the inflator. The sleeve cross-section may be square, rectangular, circular or another multi-sided shape. The inflator is secured within the sleeve by the tight fit and bias between the sleeve and the inflator. The sleeve may include a lip or flange at each end to further secure the inflator within the sleeve.

Preferably, the sleeve is configured to circumscribe the inflator and apply a tight fit. The sleeve includes a first longitudinal edge and a second longitudinal edge. The circumference of sleeve material is such that the first longitudinal edge overlaps the second longitudinal edge. Because the diameter of the sleeve cross-section is substantially the same as the diameter of the inflator cross-section, the inflator inserted longitudinally within the sleeve is biased by the sleeve seeking to return to its original cross-sectional diameter.

The sleeve includes one or more solid sections and one or more permeable sections. Preferably, the sleeve is made from a pliable material. The sleeve may be made from a metallic material such as steel, copper, or the like. In one embodiment, solid sections are separated by permeable sections in a pattern such that solid sections are positioned over exit ports in the inflator. Gas exiting the exit ports impinges against the solid sections. The force of the impinging exhaust gas and pliable nature of the sleeve allow the sleeve to expand radially to form an exhaust passage between the inflator and the sleeve. The exhaust passage leads from a solid section to a permeable section of the sleeve. Exhaust gas leaving an exit port is directed by the solid section through the exhaust passage to the permeable section. The permeable section allows the gas to pass through the sleeve and enter an area external to the diffuser.

In one embodiment, the material of the sleeve causes the diameter of the sleeve to remain enlarged following discharge of the exhaust gas from the inflator. Alternatively, the sleeve may be made of a material that allows the sleeve to return to the shape of the sleeve prior to discharge of the exhaust gas. Such materials may include heat resistant rubber, or plastics.

Preferably, the permeable section includes a plurality of holes in the sleeve that circumscribe an area of the inflator that does not include exit ports. Preferably, the holes are of a diameter to allow the permeable section to serve as a catch for gas generant residue carried by the exhaust gas. Gas generant residue is a by-product of the pyrotechnic combustion within the inflator. Alternatively, the permeable section may be a portion of the sleeve made from a porous material such as ceramic. In one embodiment, the holes have a diameter larger than the diameter of the exit ports.

The present invention includes a method of manufacturing an airbag inflator diffuser. In one embodiment, a planar rectangular blank is provided. The blank may be made of a pliable metal such as steel, copper, or the like.

Then, the blank may be stamped with a die to form a plurality of holes disposed in the blank. Preferably, the holes are organized into one or more permeable sections having solid sections between them. The permeable sections are located such that the solid sections will obstruct exit ports in the inflator when assembled.

Next, the blank is rolled such that the first longest edge overlaps a second longest edge. Preferably, the blank forms a hollow cylinder with a seam where the first longest edge overlaps the second longest edge. Finally, an inflator may be inserted longitudinally within the hollow of the sleeve. Preferably, the diameter of the sleeve is substantially the same as the diameter of the inflator. In this manner, the first longest edge and second longest edge cooperate to bias the inflator within the sleeve.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained and may be readily understood, a more particular description of the invention briefly described above will be rendered by reference to specific embodiments thereof which are illustrated in the appended drawings. Understanding that these drawings depict only embodiments of the invention, and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention can be better understood with reference to the drawings where like parts are designated with like numerals throughout.

Figure 1:
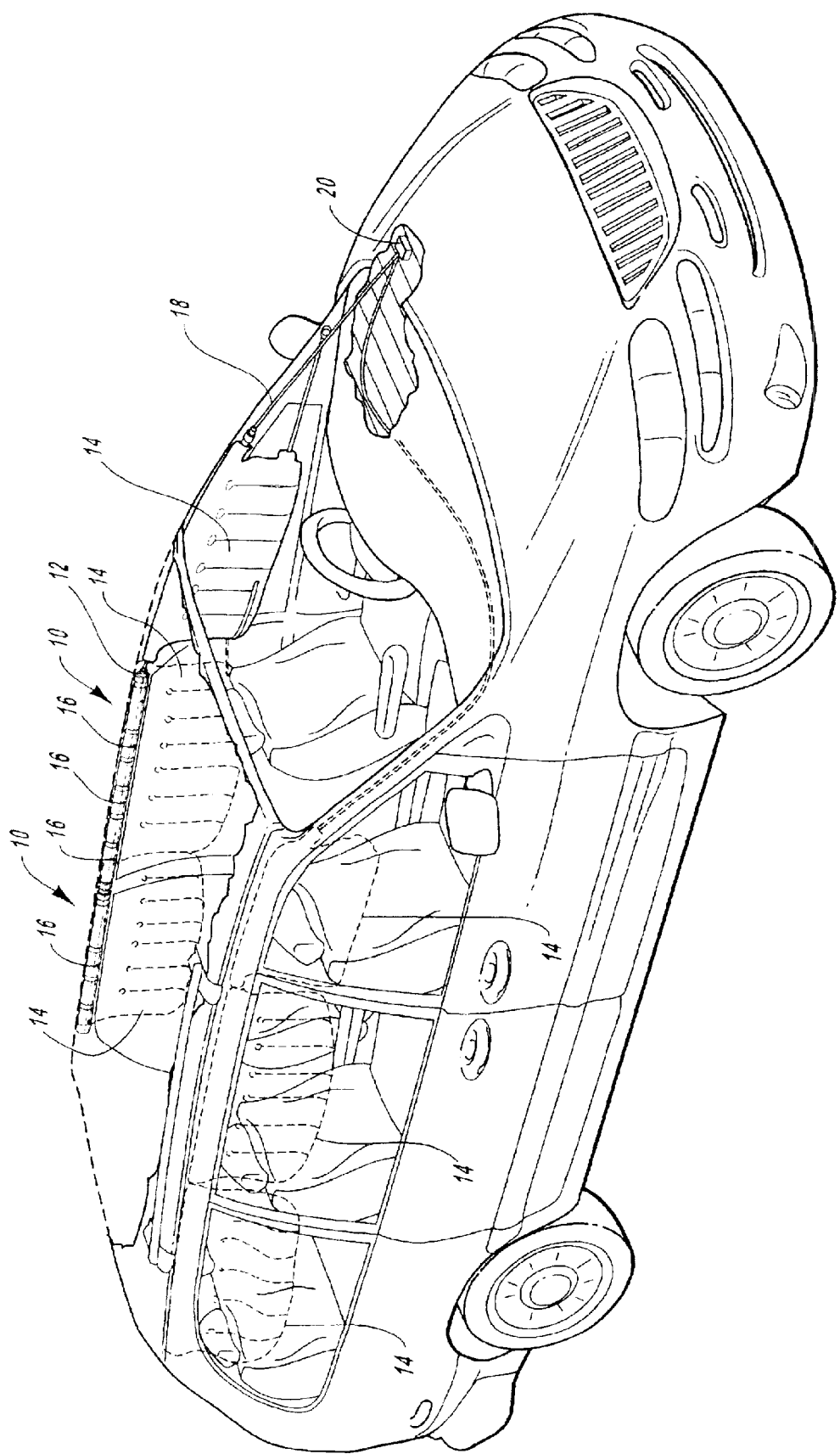
FIG. 1 is a perspective view illustrating within a vehicle where a curtain airbag apparatus and a diffuser are generally installed.

FIG. 1 is a perspective view illustrating where curtain airbag apparatuses 10 are generally installed. FIG. 1 illustrates a conventional vehicle equipped with a plurality of curtain airbag apparatuses 10. The illustrated vehicle is a van with large windows and sides. The windows are larger than those generally found in passenger cars. The larger windows increases the need for curtain airbag apparatuses 10. The van has door and window frames which connect the body of the vehicle to the vehicle roof. The vehicle roof includes a roof frame.

FIG. 1 also illustrates how the curtain airbag 14 deploys along an interior side of a vehicle. A curtain airbag inflation apparatus 10 is generally mounted behind an airbag cover (not shown) to the vehicle roof frame between a side door/window and the vehicle roof. Vehicles are generally designed to minimize the width of the vehicle roof frame on the sides to provide improved visibility and aesthetic appeal for vehicle occupants. These designs limit the storage space for the curtain airbag inflation apparatus 10. However, the curtain airbag should still inflate to protect the occupant from impact with the vehicle's side interior.

A curtain airbag inflation apparatus 10 comprises an inflator 12. Although a curtain airbag apparatus 10 and/or curtain inflator 12 may be referred to and/or depicted herein, it is contemplated that the present invention may be made and practiced in relation to various other airbag apparatuses 10 and/or inflators 12. The inflator 12 provides gas to inflate a textile bag 14. Generally, gas is generated by the combustion of pyrotechnic materials within the inflator 12. The hot gas leaves the inflator 12 through exit ports 16 and enters the textile bag 14. The inflator 12 should produce enough gas to fully inflate the textile bag 14. The textile bag 14 is sized to occupy a volume of space between an occupant and the side of the vehicle when inflated.

The inflator 12 is electronically connected by wiring 18 to the electronic control unit (ECU) 20. As mentioned above, the ECU 20 senses when the vehicle is in an accident and sends an electrical signal through wiring 18 to ignite gas generant within the inflator 12. The ignited gas generant creates exhaust gas which exits the inflator 12 through exit ports 16 to fill the textile bag 14. Prior to inflation, the textile bag 14 is stored folded between an airbag cover (not shown) and the inflator 12. If the airbag inflation apparatus 10 does not have a diffuser, then the concentrated hot exhaust gas jets may burn holes in the textile bag 14. The holes could prevent the textile bag 14 from providing adequate protection.

Figure 2A:
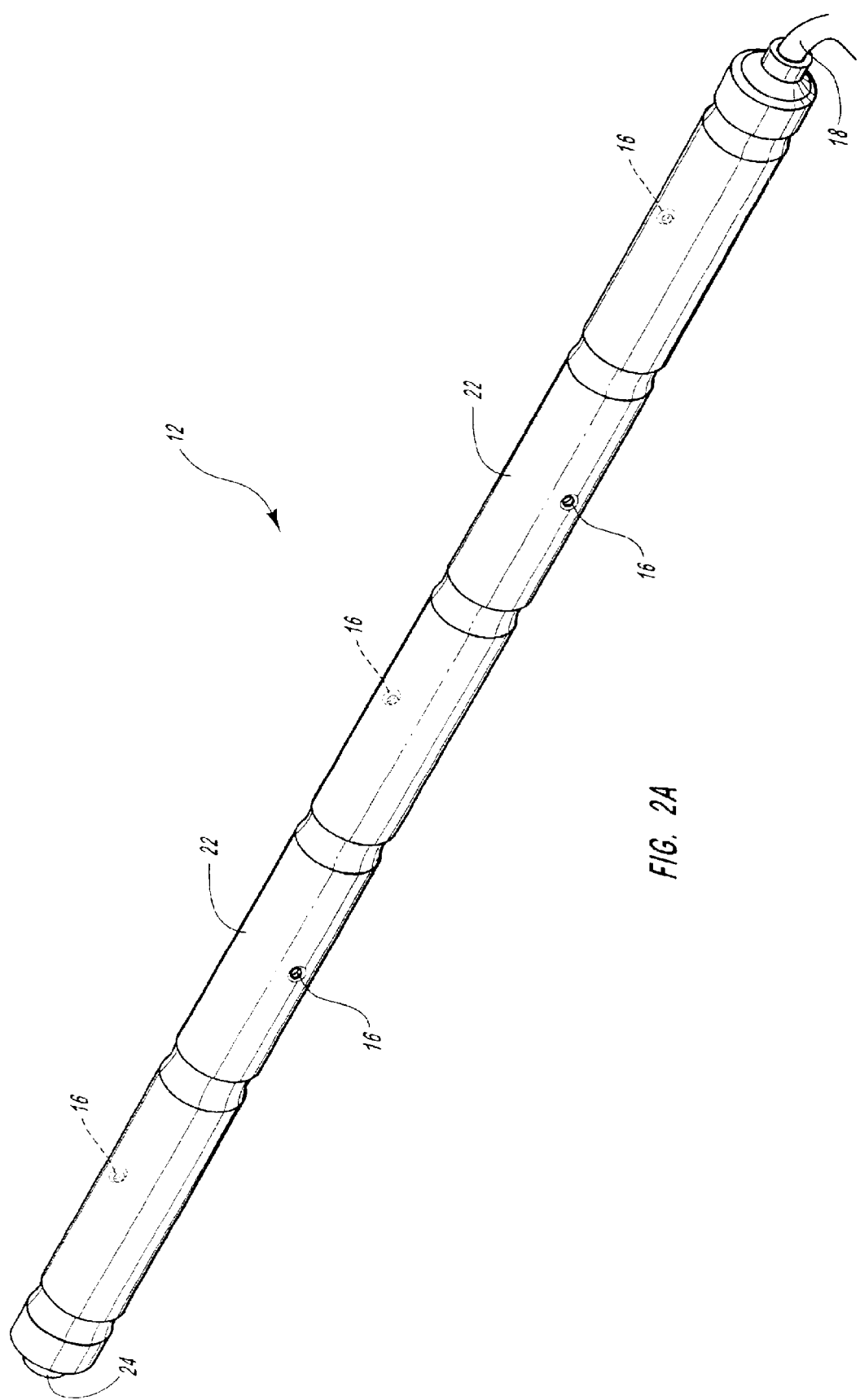
FIG. 2A is a perspective view of an airbag inflator.

FIG. 2A illustrates a curtain airbag inflator 12. The inflator 12 includes a tubular body 22. The body 22 is connected on one end to wiring 18. Within the body 22 is a hollow passage way (not shown) which contains gas generant toward the end connected to the wiring 18. The wiring 18 transmits an electrical signal which causes an initiator (not shown) to ignite the gas generant. A base 24 is attached to the body 22 opposite the wiring 18 and seals the passage way. The exhaust gas is forced to leave the inflator 12 through exit ports 16. The exit ports 16 may be disposed along the length of the body 22.

Preferably, the exit ports 16 are disposed along the body 22 to provide even distribution of exhaust gas along the length of the textile bag 14. In FIG. 2A, the exit ports 16 are distributed in-line along one side of the body 22. The body 22 may also include exit ports 16 which alternate along the opposite side of the body 22.

The exit ports 16 may be formed by drilling holes in the body 22. The body 22 and exit ports 16 may be inexpensively mass produced because there are no additional structures on the body 22 for directing the exhaust gas exiting the exit ports 16. Exhaust gas leaving the exit ports 16 is under high pressure and travels straight out the exit ports 16.

Figure 2B:
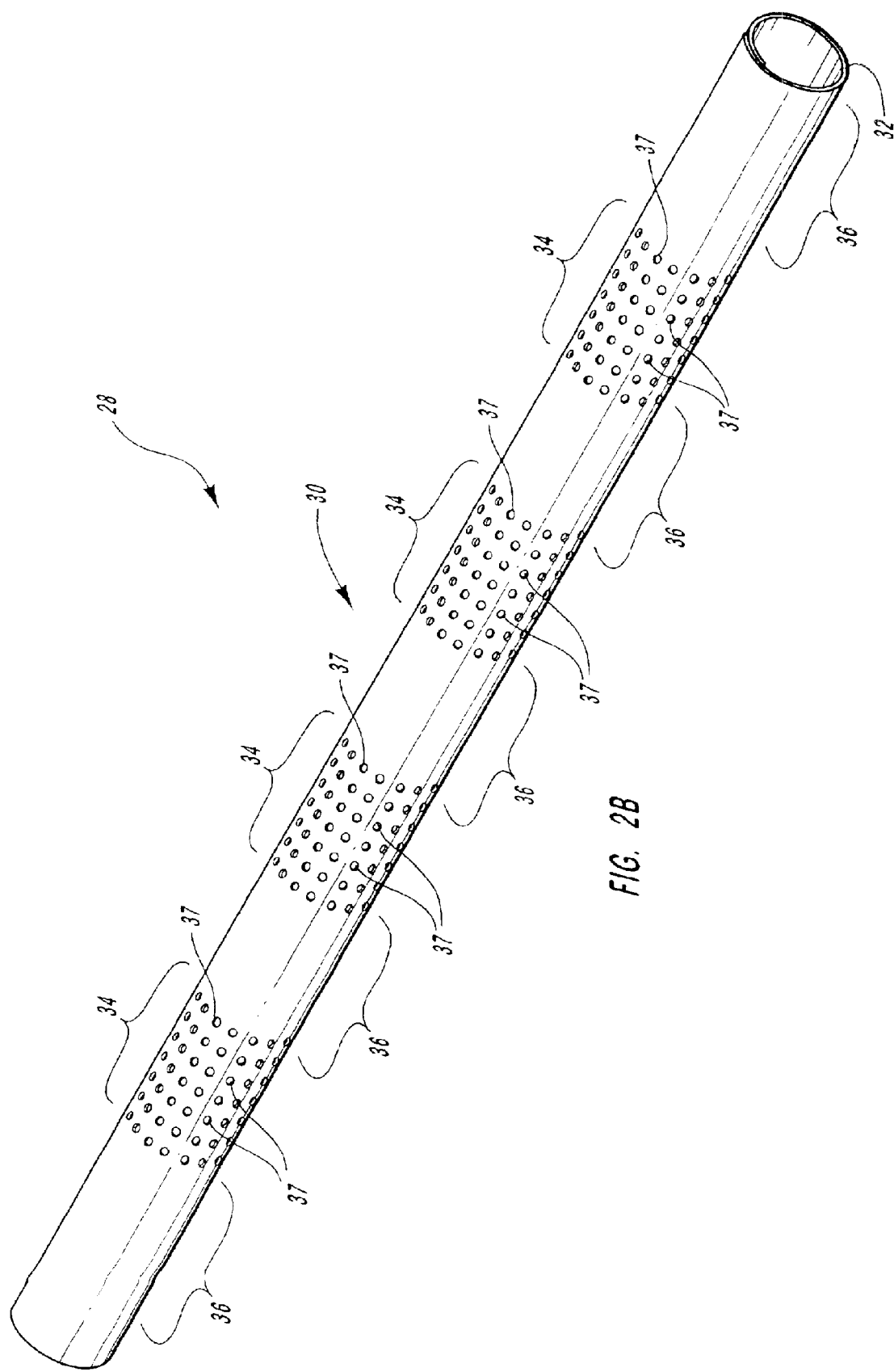
FIG. 2B is a perspective view of one embodiment of a diffuser according to the present invention.

Referring now to FIG. 2B, a diffuser 28 within the scope of the present invention is illustrated. The diffuser 28 diffuses exhaust gas leaving the inflator 12. The diffuser 28 includes a sleeve 30. The sleeve 30 is preferably made of rigid metal such as steel, stainless steel, aluminum, copper, or the like. Alternatively, the sleeve 30 maybe made from a phenolic resin based material.

Preferably, the sleeve 30 is substantially the same length as the inflator 12. Alternatively, the sleeve 30 may be of a length such that exhaust gas leaving at least one exit port 16 is diffused by the sleeve 30. Preferably, the sleeve 30 is substantially cylindrical and tubular in shape. The sleeve 30 is configured to longitudinally receive an inflator 12, such as that depicted in FIG. 2A. Accordingly, the sleeve 30 has substantially the same cross-sectional shape as the inflator 12. Preferably, the diameter of the area within the sleeve 30 is substantially the same as the diameter of the inflator 12 to allow the sleeve 30 to bias the inflator 12 within the sleeve 30. Alternatively or in addition, one or both ends of the sleeve 30 may be bent, crimped, or folded to further secure the inflator 12 within the sleeve 30.

A sleeve 30 includes a wall 32. The wall 32 provides the main structural support for the sleeve 30. Generally, the wall 32 is a solid piece of material that is shaped to form the sleeve 30. Preferably, the wall 32 is of a thickness and of a particular material such that exhaust gas exiting the exit ports 16 does not readily burn through the wall 32. The material used for the wall 32 may be rigid or flexible so long as the wall 32 is pliable when impinged upon by exhaust gas from the exit ports 16. Additionally, the thickness of the wall 32 is such that the sleeve 30 may deform radially under the force of exhaust gas exiting the exit ports 16 and impinging on the wall 32.

Preferably, the sleeve 30 includes one or more permeable sections 34 and one or more solid sections 36 disposed longitudinally along its length. Generally, permeable sections 34 are longitudinally adjacent to solid sections 36. The size and position of exit ports 16 of an inflator 12 to be used with the sleeve 30 contributes to determining the size and shape of the solid sections 36 and permeable sections 34. Preferably, the permeable sections 34 and solid sections 36 are sized and positioned in the sleeve 30 such that, upon insertion of the inflator 12, the solid sections 36 cover one or more exit ports 16 and the permeable sections 34 cover no exit ports 16.

Preferably, each permeable section 34 and solid section 36 circumscribes the sleeve 30. Generally, each section 34, 36 extends for an equal length along the sleeve 30. Alternatively, the sections 34, 36 may be of various lengths. The lengths of the sections 34, 36 depends largely on the spacing and configuration of exit ports 16 of the inflator 12. Preferably, lengths along an inflator 12 with exit ports 16 are covered by a solid section 36 and lengths without exit ports 16 are covered by a permeable section 34.

A solid section 36 is positioned along the length of the sleeve 30 to receive direct impingement of exhaust gas from the exit ports 16. A solid section 36 serves as a cooling mechanism for hot gas leaving the inflator 12. The solid sections 36 are sized and positioned to obstruct one or more exit ports 16. The hot gas from the exit ports 16 transfers heat to the solid section 36.

A solid section 36 also directs the hot exhaust gas to the permeable sections 34. Permeable sections 34 vent and diffuse the exhaust gas directed through them. Preferably, permeable sections 34 comprise a plurality of round holes 37 disposed regularly within a length of the sleeve 30. The holes 37 are preferably arranged according to a regular pattern to allow a machine to produce the permeable sections 34. Alternatively, the holes 37 may be of various shapes and sizes, including triangular, oval, rectangular, or the like. Additionally, the holes 37 may be arranged in a random fashion or according to various other patterns. Alternatively, the permeable section 34 may include striations to allow the exhaust gas to exit the sleeve 30.

In one embodiment, the permeable sections 34 may be made from different material than the material used for the sleeve 30. For example, the permeable sections 34 may be some form of porous material such as ceramic-metal composites, wire cloth, or the like. Permeable sections 34 made from other materials may be secured to the solid sections by welds, fasteners, glues, or other similar securing techniques.

Conventionally, airbag inflator diffusers 28 increase the storage space required for the airbag inflation apparatus 10. The diffuser 28 may add as much as about 9.5 millimeters to the diameter required for installation of the airbag inflation apparatus 10. A larger diameter requires a larger roof rail to accommodate the airbag inflation apparatus 10.

Referring now to FIG. 2B generally and 3A specifically, an embodiment of a diffuser 28 that minimizes the space in a roof rail required for installation of the airbag inflation apparatus 10. FIG. 3A is an end perspective view illustrating the sleeve 30 circumscribing an installed inflator 12 prior to ignition of the inflator 12.

Preferably, the sleeve 30 is formed from a single piece of material having a first longitudinal edge 38 and a second longitudinal edge 40. The material is shaped such that the first longitudinal edge 38 overlaps the second longitudinal edge 40. In this manner, a seam 42 is formed along the length of the sleeve 30. The seam 42 and sleeve 30 cooperate to receive the inflator 12 with a minimal increase to an inflator's 12 diameter.

Preferably, the diameter of the inflator 12 and the sleeve 30 at the seam 42 is at most about the size of the diameter of the inflator 12 plus three times the thickness of the sleeve wall 32. Generally, the minimum diameter, excluding the seam 42, is the diameter of the inflator 12 plus two times the thickness of the sleeve wall 32. Generally, the sleeve wall 32 is less than one millimeter thick.

Preferably, the first longitudinal edge 38 overlapping the second longitudinal edge 40 leaves little to no space between the outside surface of the inflator 12 and the sleeve wall 32. However, to function properly a diffuser 28 should provide an exhaust passage 44 to allow gas from the exit ports 16 to travel to a permeable section 34 to exit the airbag inflation apparatus 10 and inflate the airbag 14.

Figure 3B:
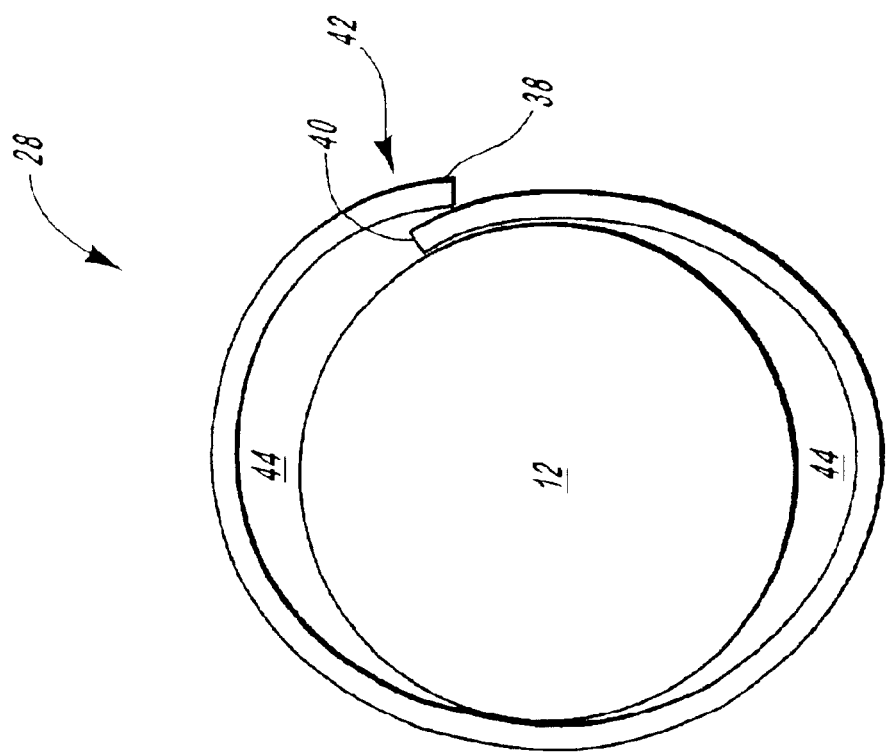
FIG. 3B is an end perspective view illustrating the sleeve and an exhaust passage formed following ignition of the inflator.
Figure 3A:
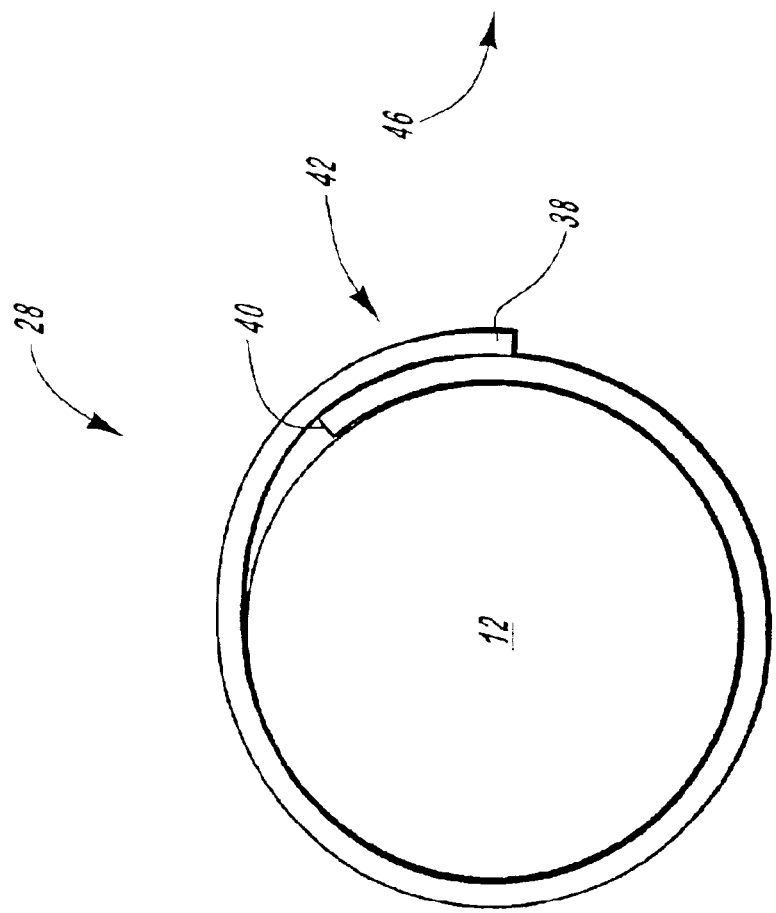
FIG. 3A is an end perspective view illustrating the sleeve circumscribing the inflator prior to ignition of the inflator.

FIG. 3B illustrates formation of an exhaust passage 44. As mentioned above, exhaust gas leaving the exit port 16 may be concentrated due to the size of the exit port 16 and force created by ignited gas generant within the inflator 12. The exhaust gas leaves the exit port 16 in a direction perpendicular to the exit port 16. The exiting exhaust gas impinges one or more solid sections 36. The exhaust gas exerts a force against the solid section 36. The force on one or more solid sections 36 causes the sleeve 30 to expand radially. The sleeve 30 expands due to the nature of the material used as well as the seam 42 formed by the first longitudinal edge 38 overlapping the second longitudinal edge 40. The seam 42 allows the first longitudinal edge 38 to move laterally with respect to the second longitudinal edge 40. The force of the exhaust gas causes the sleeve 30 to deform at a bend area 46 generally opposite the seam 42.

Preferably, the bend area 46 is an area of sleeve material along the length of the sleeve 30. Alternatively, the bend area 46 may be a spring biased hinge, grooved or thinned portion of the wall 32, or other such structure that functions to allow a biased bending in response to the force of the exhaust gas against a solid section 36. It is contemplated that embodiments employing these alternative structures for the bend area 46 are within the scope of the present invention.

Preferably, the material used in the bend area 46 is pliable and flexible but does not break or tear when exposed to the force of the exhaust gas. Generally, the bend area 46 exerts a counter bias against the force of the exhaust gas to limit the amount of radial expansion of the sleeve 30. In this manner, the sleeve 30 expands to form one or more exhaust passages 44 but the first longitudinal edge 38 remains overlapping the second longitudinal edge 40. It is desirable that the first longitudinal edge 38 overlap the second longitudinal edge 40 to prevent exhaust gas from escaping through the seam 42.

In an alternative embodiment, the sleeve 30 is made from a very thick and strong material such as temperature resistant rubber, or the like. In this embodiment, there may be no seam 42. Or, the seam 42 may include securing the first longitudinal edge 38 to the second longitudinal edge 40.

In this alternative embodiment, the exhaust passage 44 may be created by the sleeve material expanding under the force of the exhaust gas such that a passage 44 is formed between solid sections 36 and permeable sections 34. Once the exhaust gas passes the material may contract to re-close the passage 44.

Returning now to a preferred embodiment, the solid section 36 deflects the exhaust gas longitudinally toward either end of the sleeve 30. This deflection aids in forming the one or more exhaust passages 44 and transfers some of the exhaust gas heat to the solid section 36. The solid section 36 directs the exhaust gas toward an exhaust passage 44. Dispersion of the exhaust gas causes the gas to cool as it expands and transfers its heat to air within the one or more exhaust passages 44.

The exhaust gas then travels through the one or more exhaust passages 44 to a permeable section 34. Finally, the exhaust gas passes through the holes 37 of the permeable section 34 to an area external to the inflation apparatus 10. As the gas passes through the holes 37, the gas is further dispersed which causes the gas to further cool.

The embodiments depicted in FIGS. 3A and 3B illustrate that a diffuser 28 according to the present invention provides an operable exhaust passage 44 to cool, direct and evenly disperse exhaust gas. The diffuser 28 also requires a compact storage space.

Conventionally, it is desirable to produce and assemble large numbers of generic airbag inflation apparatuses 10 to reduce costs. However, conventional airbag inflation apparatuses 10 often require that the apparatus 10 be specifically designed to accommodate particular vehicle features, such as the contour of a roof frame. Certain embodiments of the present invention allow for mass production of generic airbag inflation apparatuses 10 because the diffuser 28 and inflator 12 may be bent during installation without significantly effecting the operability of the diffuser 28.

Figure 4:
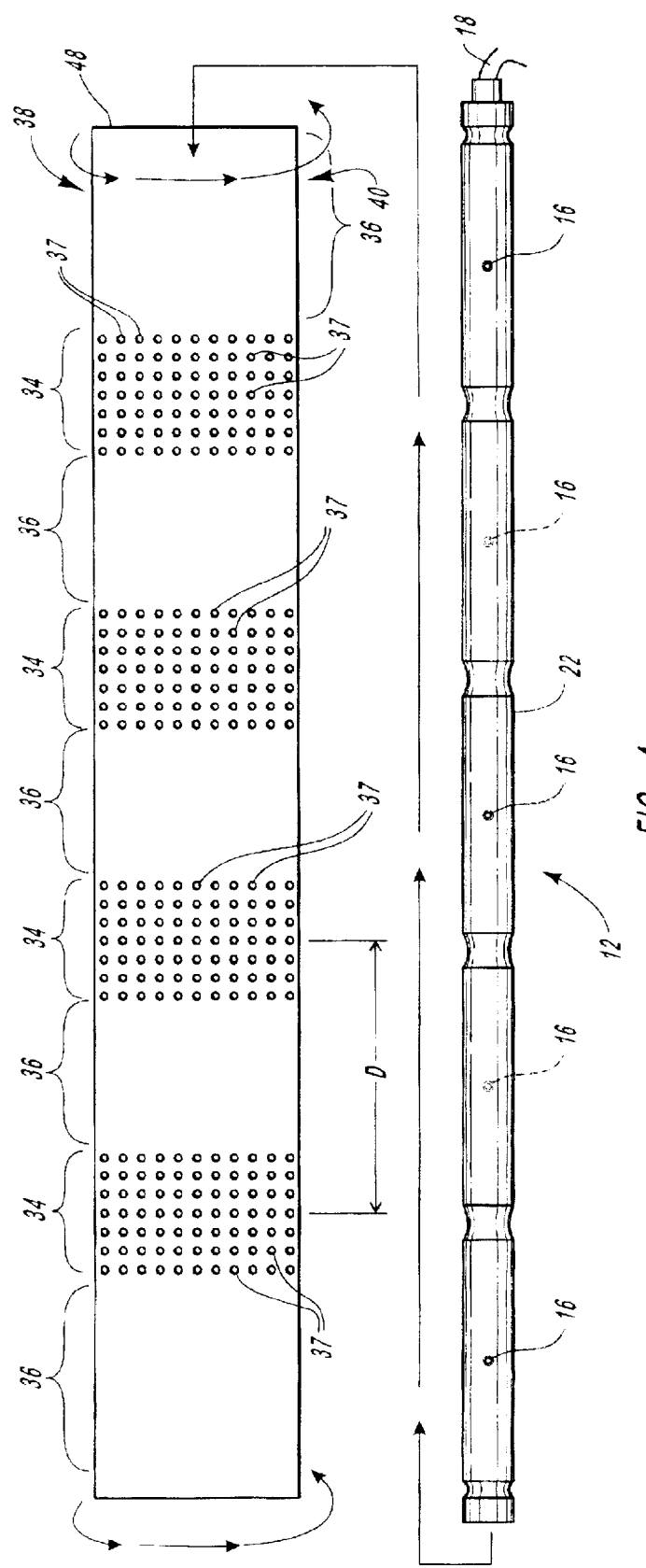
FIG. 4 is a perspective view of a blank that may be used to form a sleeve for receiving the illustrated airbag inflator.

Referring now to FIG. 4, a method of fabricating a diffuser 28 within the scope of the present invention will be described with reference to the illustrated structures.

According to one method of manufacture, a blank 48 is rolled to form a substantially cylindrical shape. The first longitudinal edge 38 overlaps a second longitudinal edge 40 to form a sleeve 30 capable of receiving the illustrated inflator 12.

According to one method of manufacture, a planar rectangular blank 48 is provided. The blank 48 may be a piece of about 24 to about 26 gage steel. Alternatively, other gages and kinds of materials, both metallic and non-metallic may be used including copper, aluminum, compositions including phenolic resins, and the like. Preferably, the material for the blank 48 is pliable. The blank 48 may be about the same length as the inflator 12 it will receive. The width may be about the same as the diameter of the inflator 12 times Pi plus the desired overlap.

Next, one or more permeable sections 34 are formed in the blank 48. In one embodiment, the blank 48 is stamped in a die (not shown) to form a plurality of holes 37 in an area comprising a permeable section 34. The die may form a plurality of permeable sections 34 with a single stamping. Preferably, the holes 37 are disposed within the blank 48 according to a regular pattern. As mentioned before, the pattern and shape of the holes 37 may vary.

The size and number of holes 37 depends on the volume of exhaust gas desired to be vented through each permeable section 34 and the desired venting rate. The volume and venting rate may be calculated using conventional techniques to determine the number and size of holes 37. Preferably, the number and size of holes 37 are such that the blank 48/sleeve 30 retains its structural integrity.

Referring still to FIG. 4, as a result of forming one or more permeable sections 34, one or more solid sections 36 are formed in the blank 48. Accordingly, the positioning of the permeable sections 34 determines the positioning of the solid sections 36. Preferably, a substantially equal distance D separates corresponding locations on two neighboring permeable sections 34. Alternatively, the permeable sections 34 may be separated from each other by various distances along the blank 48.

In a preferred embodiment, the permeable sections 34 are located such that each solid section 36 covers one or more exit ports 16 of an inflator 12 positioned longitudinally with respect to the blank 48 as illustrated in FIG. 4. Alternatively, the permeable sections 34, and thereby the solid sections 36, may be positioned at various locations along the length of the blank 48.

Preferably, distance D represents the distance from the lengthwise center of a first permeable section 34 to the lengthwise center of a second permeable section 34. Similarly, distance D may represent the distance from a first solid section 36 to an neighboring second solid section 36 along the length of the blank 48. Alternatively, the distance between solid sections 36 and permeable sections 34 may vary. Generally, one-half of distance D represents the distance the exhaust gas travels from an exit port 16 before exiting the diffuser 28 formed from the blank 48.

According to one method of manufacture, the blank 48 is then rolled such that the first longitudinal edge 38 overlaps the second longitudinal edge 40. Generally, the blank 48 may be rolled on a rolling press. The blank 48 may be rolled multiple times to progressively bend the first longitudinal edge 38 towards the second longitudinal edge 40. The blank 48 may be rolled until the first longitudinal edge 38 overlaps the second longitudinal edge 40. Alternatively, a rolling machine, or die press may be used to roll the blank 48 in one motion and overlap the first longitudinal edge 38 over the second longitudinal edge 40.

The width of the blank 48 affects the amount the first longitudinal edge 38 overlaps the second longitudinal edge 40 as well as the diameter of the resulting sleeve 30. Once rolled, the blank 48 forms the substantially cylindrical sleeve 30 discussed in relation to FIGS. 2B, 3A, and 3B. Generally, the diameter of the sleeve 30 is about the same as the inflator 12 to be inserted and the distance the first longitudinal edge 38 overlaps the second longitudinal edge 40 may be about 3.175 millimeters. Alternatively, the distance the first longitudinal edge 38 overlaps the second longitudinal edge 40 and diameter of the sleeve 30 may vary.

Finally, as indicated by the arrows, the inflator 12 is inserted longitudinally within the sleeve 30. Preferably, the inflator 12 is inserted such that one or more exit ports 16 are obstructed by solid sections 36. Generally, the inflator 12 is held within the sleeve 30 by the bias created because the diameters of the inflator 12 and sleeve 30 are preferably about the same. Additionally, or in the alternative, the ends of the diffuser 28 may be crimped, dimpled, notched, or otherwise configured to further secure the inflator 12. In this manner, a diffuser 28 within the scope of the present invention may be manufactured.

Conventionally, a solid section 36 covers a specific arc above an exit port 16 of the inflator 12 but does not circumscribe the inflator 12. Because conventional inflators 12 have exit ports 16 disposed on opposite sides of an inflator 12, the inflator 12 and/or diffuser 28 need to be rotated during installation or assembly such that all the exit ports 16 properly align beneath a solid section 36.

The requirement in conventional diffusers 28 for alignment between the exit ports 16 and solid sections 36 may add significantly to the cost for producing and assembling the airbag inflation apparatuses 10. Commonly, inflators 12 and diffusers 28 are mass produced and assembled using conventional machinery. If the machine is required to align the exit ports 16 and solid sections 36, the machine may require exit port 16 and solid section 36 detection mechanisms to properly rotate the diffuser 28 with respect to the inflator 12, or vice versa. This detection equipment may be very expensive and may increase production costs.

In a preferred embodiment, the inflator 12 does not need to be rotated with respect to the solid sections 36. The exit ports 16 and solid sections 36 align simply by fully inserting the inflator 12 within the sleeve 30. Because a solid section 36 circumscribes the inflator 12, the exit ports 16 are automatically covered by the solid section 36. A preferred embodiment allows airbag inflation apparatuses 10 to be mass produced by machines without costly detection equipment.

Figure 5:
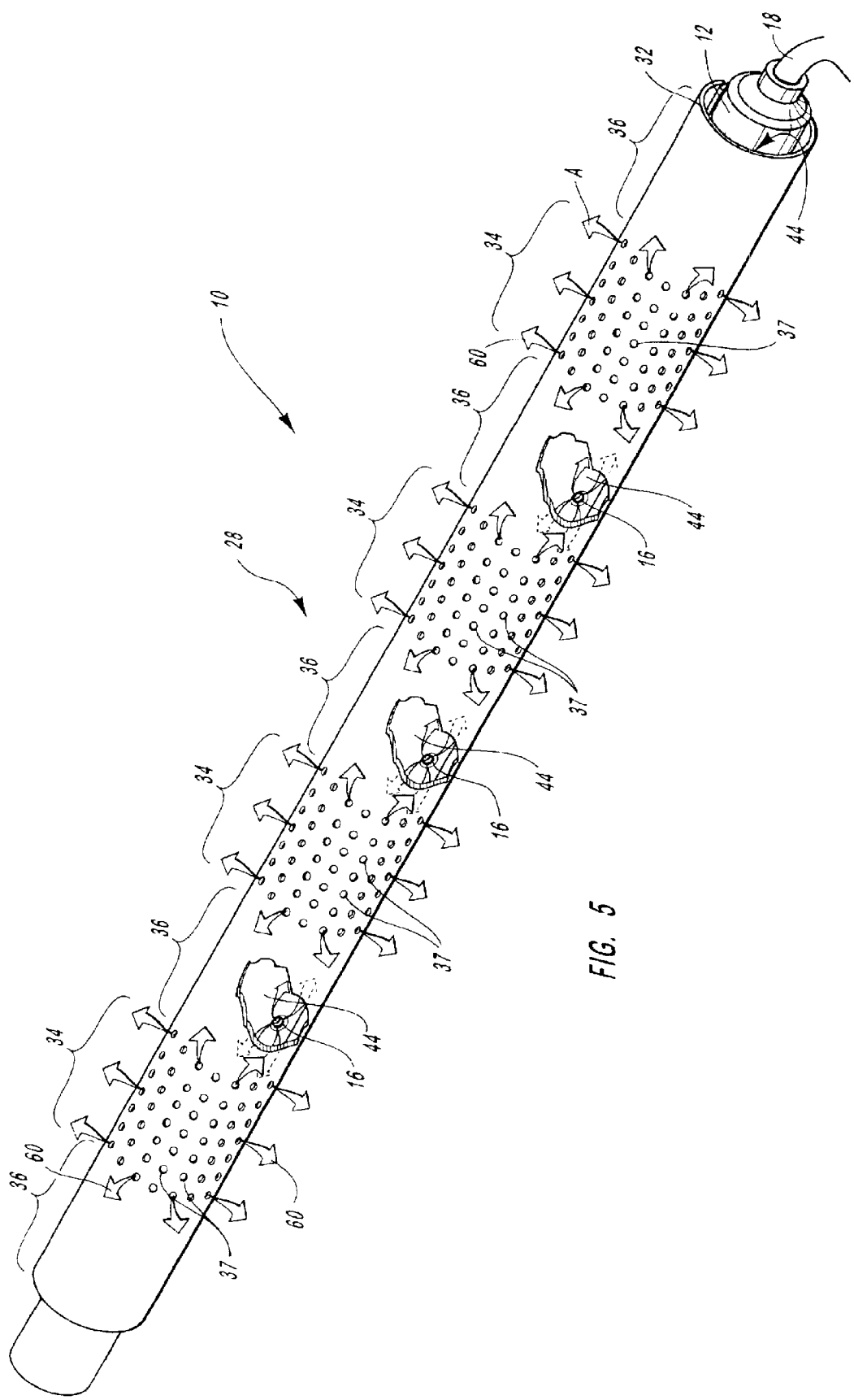
FIG. 5 is a perspective view of one embodiment of the present invention illustrating the flow of exhaust gas from the inflator and through the diffuser.

FIG. 5 illustrates the operation of the diffuser 28 on an activated inflator 12. The operation of the diffuser 28 may be understood by tracing the flow 60 of exhaust gas from within the inflator 12 to an area external to the diffuser 28. The flow 60 of exhaust gas is illustrated by arrows. Of course, the exhaust gas follows other paths. Flow 60 is simply an indication of the general direction the exhaust gas flows through the diffuser 28. Flow 60 is described below in relation to one solid section 36. However, a similar flow 60 may occur at all the solid sections 36 illustrated.

Prior to activation, the diffuser 28 occupies substantially the same amount of space as the inflator 12 alone. The inflator's 12 diameter is minimally increased by including the diffuser 28. This space savings may result in a significantly smaller installation space which may improve the aesthetic appeal of a vehicle roof or support rail. The inflation apparatus 10 may be installed in a smaller area than conventional inflator 12 and diffuser 28 assemblies.

Once activated, an airbag system generally extends into the interior compartment to protect the occupant. At that point in time, minimal storage of the inflation apparatus 10 is not required. Therefore, in a preferred embodiment, an exhaust passage 44, which generally increases the storage space required for conventional inflation apparatuses 10, is created by the exhaust gas leaving the inflator 12.

Activation of the inflator 12 creates exhaust gas within the inflator 12 by igniting gas generant. The inflator 12 is sealed except for exit ports 16. FIG. 5 illustrates through a cut-away portion the flow 60 leaving an exit port 16. The flow 60 is very hot and has a high velocity. The high velocity causes the flow 60 to move away from the port 16 in a perpendicular direction.

The flow 60 is preferably blocked by solid section 36. The force of the flow 60 against the solid section 36 causes the diffuser 28 to expand radially. The radial expansion of the diffuser wall 32 creates an exhaust passage 44. Preferably, the exhaust passage 44 extends within the diffuser 28 from each exit port 16 longitudinally to a permeable section 34.

Generally, when gas generant within an inflator 12 burns, 10 to 40% of the gas generant's original volume remains as residue. The residue may be in solid and/or liquid form as ash or slag. This residue may be projected through the hollow passage way (not shown) of the inflator 12 and out the exit ports 16. The residue may burn holes in the textile bag 14 and possibly strike and injure the occupant.

In a preferred embodiment, the impingement of the exhaust gas on a solid section 36 transfers heat to the solid section 36 thereby cooling the exhaust gas. The exhaust gas also transfers residue to the solid section 36. Molten liquid residue tends to condense, collect, and cool, on the surface area of both the solid sections 36 and the permeable sections 34. Additionally, holes 37 in the permeable sections 34 may be sized to aide in catching and collecting residue carried by the exhaust gas. In this manner, a majority of the residue is captured within the exhaust passage 44.

The solid section 36 diverts the flow 60 through the forming exhaust passage 44 towards both ends of the solid section 36. The exhaust gases expand as they move from the high pressure area inside the inflator 12 to the low pressure region inside exhaust passage 44. The expansion causes the gas to cool. Then, the flow 60 mixes with flow 60 from a neighboring solid section 36. This mixing forces the flow 60 to pass through the holes 37 in the permeable section 34 and enter an area external to the diffuser 28. The flow 60 then goes on to inflate the textile bag 14 of the airbag inflation apparatus 10.

Referring generally to FIGS. 1–5, the present invention provides an airbag diffusion apparatus 10 which is simple to fabricate. The apparatus 10 uses standardized inflators 12 having exit ports 16 which are direction neutral. The exhaust gas is directed by the diffuser 28. The assembled inflator 12 and diffuser 28 may be bent during installation to accommodate vehicle differences such as different roof contours. The diffuser 28 allows the apparatus 10 to be installed in a much smaller space than conventional inflation apparatuses because the exhaust passage 44 is not formed until the inflator 12 is activated. The apparatus 10 further provides a diffuser 28 which sufficiently cools and diffuses the exhaust gas.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. An airbag inflator diffusion system comprising:
   an airbag inflator having an exhaust gas exit port; and
   a sleeve for receiving the inflator and securing the inflator within the sleeve, the sleeve being expandable radially under a force of impinging exhaust gas from the exit port to form an exhaust passage between the inflator and the sleeve, the sleeve further comprising a solid section for receiving direct impingement of the exhaust gas from the exit port and to direct the exhaust gas through the exhaust passage, and a permeable section adjacent the solid section for allowing the exhaust gas to flow from the exhaust passage to an area external to the sleeve, the permeable section circumscribing a length of the inflator excluding the exit port.

2. An airbag inflator diffusion system, as in claim 1, wherein the solid section is further configured to circumscribe the exit port.

3. An airbag inflator diffusion system, as in claim 2, wherein the sleeve comprises a plurality of solid sections and permeable sections and the airbag inflator comprises a plurality of exit ports.

4. An airbag inflator diffusion system, as in claim 3, wherein each solid section is positioned next to a permeable section.

5. An airbag inflator diffusion system, as in claim 4, wherein the sleeve is substantially cylindrical.

6. An airbag inflator diffusion system, as in claim 5, wherein a first longitudinal edge of the sleeve overlaps a second longitudinal edge along a length of sleeve.

7. An airbag inflator diffusion system, as in claim 6, wherein the sleeve is metallic.

8. An airbag inflator diffusion system, as in claim 1, wherein the sleeve is made from a flexible material.

9. An airbag inflator diffusion system, as in claim 1, wherein the sleeve is rigid.

10. An airbag inflator diffusion system, as in claim 1, wherein the permeable section comprises a plurality of holes formed in the sleeve.

11. An airbag inflator diffusion system, as in claim 1, wherein the permeable section comprises a porous material configured to allow exhaust gas to pass through the sleeve.

12. An airbag inflator diffusion system, as in claim 1, wherein a cross-sectional shape of the sleeve is substantially the same as the cross-sectional shape of the inflator.

13. An airbag inflator diffuser comprising:

a tubular sleeve having a first longitudinal edge that overlaps a second longitudinal edge along a length of the sleeve, wherein the sleeve expands radially to form an exhaust passage under a force of impinging exhaust gas from an exit port of an airbag inflator when installed within the sleeve;

the sleeve further comprising a solid section positioned to impede a flow of exhaust gas from the exit port and direct the flow to the exhaust passage; and a permeable section positioned to allow exhaust gas to flow from the exit port through the exhaust passage and permeable section to an area external to the airbag inflator diffuser.

14. An airbag inflator diffuser, as in claim 13, further comprising a plurality of holes disposed in the permeable section.

15. An airbag inflator diffuser, as in claim 13, further comprising a plurality of solid sections and a plurality of permeable sections.

16. An airbag inflator diffuser, as in claim 15, wherein the solid sections are positioned between permeable sections along a length of the sleeve.

17. An airbag inflator diffuser, as in claim 15, wherein the sleeve is formed from a blank rolled to form a substantially cylindrical shape and configured such that a first edge of the blank overlaps a second edge.

18. An airbag inflator diffuser, as in claim 17, wherein the blank is metal.

19. An airbag inflator diffusion system comprising:

an airbag inflator having an exhaust gas exit port; and a metallic tubular sleeve for receiving the inflator, the sleeve having a first longitudinal edge that overlaps a second longitudinal edge along a length of the sleeve, wherein the sleeve expands radially under a force of impinging exhaust gas from the exit port to form an exhaust passage between the inflator and the sleeve.

* * * * *